US008048966B2

(12) United States Patent
Myrick et al.

(10) Patent No.: US 8,048,966 B2
(45) Date of Patent: Nov. 1, 2011

(54) USE OF A KINKED RIGID-ROD POLYARYLENE

(75) Inventors: Leslie J. Myrick, Poplarville, MS (US);
David B. Thomas, Poplarville, MS (US);
Roy L. Carter, Chicago, IL (US);
Nikica Maljkovic, New Orleans, LA (US); Christopher Davis, Diamondhead, MS (US); Scott A. Harding, Slidell, LA (US); Mohammad Jamal El-Hibri, Atlanta, GA (US)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 0 days.

(21) Appl. No.: 12/940,098

(22) Filed: Nov. 5, 2010

(65) Prior Publication Data
US 2011/0046292 A1 Feb. 24, 2011

Related U.S. Application Data

(60) Division of application No. 12/281,027, filed as application No. PCT/EP2007/052073 on Mar. 6, 2007, now Pat. No. 7,875,696, said application No. 12/281,027 is a continuation-in-part of application No. 11/850,739, filed on Sep. 6, 2007, which is a continuation of application No. PCT/EP2006/060535, filed on Mar. 7, 2006.

(60) Provisional application No. 60/836,946, filed on Aug. 11, 2006, provisional application No. 60/842,369, filed on Sep. 6, 2006, provisional application No. 60/842,367, filed on Sep. 6, 2006, provisional application No. 60/842,368, filed on Sep. 6, 2006, provisional application No. 60/842,366, filed on Sep. 6, 2006, provisional application No. 60/842,365, filed on Sep. 6, 2006.

(51) Int. Cl.
*C08F 283/00* (2006.01)
(52) U.S. Cl. ..................... 525/416; 428/411.1; 428/457; 525/461; 525/462; 525/471; 528/220; 528/397
(58) Field of Classification Search .................. 264/319; 428/411.1, 457; 525/534, 461, 462, 416, 525/471; 528/218, 220, 397
See application file for complete search history.

(56) References Cited

U.S. PATENT DOCUMENTS

| | | | |
|---|---|---|---|
| 5,646,231 A | 7/1997 | Marrocco et al. | |
| 5,654,392 A | 8/1997 | Marrocco et al. | |
| 5,760,131 A | 6/1998 | Marrocco et al. | |
| 5,886,130 A | 3/1999 | Trimmer et al. | |
| 6,586,554 B1 | 7/2003 | Takahashi | |
| 7,750,091 B2 | 7/2010 | Maljkovic et al. | |
| 7,820,767 B2 | 10/2010 | El-Hibri et al. | |
| 2006/0207464 A1 | 9/2006 | Maljkovic et al. | |
| 2008/0312387 A1 | 12/2008 | El-Hibri et al. | |
| 2009/0036594 A1 | 2/2009 | Maljkovic et al. | |
| 2009/0069511 A1 | 3/2009 | Thomas et al. | |
| 2009/0234077 A1 | 9/2009 | Myrick et al. | |

FOREIGN PATENT DOCUMENTS

| | | |
|---|---|---|
| DE | 4015542 | 11/1991 |
| EP | 436111 | 7/1991 |
| EP | 773248 | 5/1997 |
| EP | 773249 | 5/1997 |
| JP | 2001-115087 | 4/2001 |
| JP | 2001-116904 | 4/2001 |
| JP | 2003-073461 | 3/2003 |
| WO | WO 93/18076 | 9/1993 |
| WO | WO 97/11099 | 3/1997 |
| WO | WO 2005/086727 | 9/2005 |
| WO | WO 2006/094988 | 9/2006 |
| WO | WO 2007/101847 | 9/2007 |
| WO | WO 2007/101852 | 9/2007 |
| WO | WO 2007/101857 | 9/2007 |
| WO | WO 2007/101858 | 9/2007 |
| WO | WO 2008/028695 | 3/2008 |

OTHER PUBLICATIONS

Declaration under 37 CFR 1.132 from U.S. Appl. No. 12/281,027; Jul. 7, 2010.*
PCT Search Report dated Jan. 14, 2008, for International Application PCT/EP2007/052073 (3 pages).
Weast, R.C., "Definitive Rules for Nomenclature of Organic Chemistry," CRC Handbook of Chemistry and Physics, 64$^{th}$ Edition, (1983-1984), p. C1-C44, CRC Press Inc., Boca Raton, Florida (44 pages).
Randic, M., "Aromaticity of Polycyclic Conjugated Hydrocarbons," Chemical Reviews (2003), vol. 103, pp. 3449-3605, American Chemical Society (158 pages).
Standard ASTM D648, Historical 2006, "Test Method for Deflection Temperature of Plastics Under Flexural Load in the Edgewise Position," pp. 1-13.
Carter, R., et al., "Continuous Foam Extrusion of Rigid-Rod Polyphenylenes", Journal of Cellular Plastics (Jan. 2005), vol. 41(1), pp. 29-39, Sage Publicvations Ltd.
Marroco M., et al., "Poly-X™ Self Reinforced Polymers: Processible Molecular Composites", 39$^{th}$ International SAMPE Symposium and Exhibition (Apr. 11-14, 1994), pp. 1063-1072, Society for the Advancement of Material and Process Engineering.
Trimmer M.S., et al., "Self-Reinforced Polyphenylenes: New High Performance Fire Resistant Materials," 42$^{nd}$ International SAMPE Symposium (May 4-8, 1997), pp. 1315-1324, Society for the Advancement of Materials and Process Engineering.
Koo, J.H., et al., "Evaluation of Fire Safe Polymers/Composites for Marine Application", 43$^{rd}$ International SAMPE Symposium and Exhibition (May 31-Jun. 4, 1998), pp. 1077-1089, Society for the Advancement of Material and Process Engineering.
Trimmer, M.S., et al., "Application of High Modulus Polyarylene Resins in Advanced Composites," 44$^{th}$ International SAMPE Symposium and Exhibition (May 23-27, 1999), pp. 1365-1374).
Ha Y.-H et al., "Miscible Blends of Poly(benzoyl Paraphenylene) and Polycarbonate," Polymer (2001), vol. 42 (15), pp. 6463-6472, Elsevier Science Ltd.
Naitove M.H., "Self-Reinforcing Thermoplastic is Harder, Stronger, Stiffer without Added Fibers," Plastics Technology Magazine (Jul. 2003), Gardner Publications Inc.

(Continued)

*Primary Examiner* — David W Wu
*Assistant Examiner* — Robert Jones, Jr.
(74) *Attorney, Agent, or Firm* — Oblon, Spivak, McClelland, Maier & Neustadt, L.L.P.

(57) ABSTRACT

Use of a kinked rigid-rod polyarylene of a particular type for its fire resistance properties.

9 Claims, No Drawings

OTHER PUBLICATIONS

Mapleston, P., "New Rigid-Rod Polymer Jumps to Market", Modern Plastics (Nov. 1, 2003).

Solvay Advanced Polymers, LLC., "PrimoSpire® Self-Reinforced Polyphenylene More Remarkable Strength and Stiffness Than Any Unfilled Plastics" (online), (20071024), retrieved on Dec. 19, 2007 from the Internet: http://www.solvayadvanced polymers.com/products/bybrand/parmax/0,,38808-2-0,00.htm.

Solvay Advanced Polymers, LLC, "Preliminary Data PrimoSpire™ PR-250 Self-Reinforced Polyphenylene" (online), (2006), retrieved from the Internet: http://www.solvayadvancedpolymerse.com/static/wma/pdf/8/0/4/6/Primospire_PR250.pdf.

Edwards A., et al., "Photoluminescence and Electroluminescence of a Soluble PPP-type Polymer", Synthetic Metals (1997), vol. 84(1-3), pp. 639-640, Elsevier Science, Ltd.

Maxdem, Brochure, "Poly-X™ Self Reinforced Polymers", No publication date.

MPT, Brochure, "Parmax® Self-Reinforced Polymers", No publication date.

Ha Y.-H., et al., "Investigation of the Phase Behaviour of Blends of Poly(benzoyl Paraphenylene) and various Thermoplastics", $58^{th}$ ANTEC—SPE (2000), vol. 2, pp. 2532-2537, SPE.

Shin, H.C., et al., "Scratch Resistant Polycarbonate Based Alloy for Transparent Applications", SPE Asia Conference, Jeju Island, Korea (20060608) 14 pages.

Standard ASTM E1354, Historical 2004 Revision A, "Test Method for Heat and Visible Smoke Release Rates for Materials and Products Using an Oxygen Consumption Calorimeter", pp. 1-18.

Confidential Sales Information (1 page).

\* cited by examiner

US 8,048,966 B2

USE OF A KINKED RIGID-ROD POLYARYLENE

CROSS-REFERENCE TO RELATED APPLICATIONS

The present application is a divisional application of U.S. application Ser. No. 12/281,027 filed Aug. 28, 2008, now U.S. Pat. No. 7,875,696, which (1) is a national stage application under 35 U.S.C. §371 of International Application No. PCT/EP2007/052073, filed Mar. 6, 2007, which claims the benefit under 35 U.S.C. §119(a) and (b) of (i) PCT application no. PCT/EP2006/060535 filed Mar. 7, 2006, and which claims the benefit under 35 U.S.C. §119(e) of (ii) U.S. provisional application No. 60/836,946 filed Aug. 11, 2006, (iii) U.S. provisional application No. 60/842,369 filed Sep. 6, 2006, (iv) U.S. provisional application No. 60/842,367 filed Sep. 6, 2006, (v) U.S. provisional application No. 60/842,368 filed Sep. 6, 2006, (vi) U.S. provisional application No. 60/842,366 filed Sep. 6, 2006, and (vii) U.S. provisional application No. 60/842,365 filed Sep. 6, 2006; and (2) is a continuation-in-part of U.S. application Ser. No. 11/850,739 filed Sep. 6, 2007, which is a continuation of PCT application No. PCT/EP2006/060535 filed Mar. 7, 2006; and (3) further claims the benefit under 35 U.S.C. §365(a) of PCT Application No. PCT/EP2006/060535, filed Mar. 7, 2006, the whole content of all of these applications being herein incorporated by reference for all purposes.

FIELD OF THE INVENTION

The present invention relates to a new use of a kinked rigid-rod polyarylene of a specific type, and to certain particular articles made from said kinked rigid-rod polyarylene.

BACKGROUND OF THE INVENTION

Polyarylenes exhibit some outstanding performance properties, including exceptionally high strength, stiffness, hardness, scratch resistance and dimensional stability. Kinked rigid rod polyarylenes exhibit further a good processability and fusibility, in substantial progress with unkinked rigid-rod polyarylenes.

Generally speaking, the merits of polyarylenes have been known for several years. To this point, the INTERNET website of SOLVAY ADVANCED POLYMERS currently mentions, op. cit.: "Make a Fire Without the Smoke. Studies show that Primospire™ SRPs [=polyphenylenes, generally speaking] may offer excellent performance for ablative insulation. With zero toxic emissions ($CO_2$ and $H_2O$ are the byproducts) and superior mechanicals pre- and post-char formation, Primospire SRPs are lightweight alternatives to ceramic and metal insulative materials."

Also generally speaking, the introduction of a scientific publication entitled "Continuous foam extrusion of rigid-rod polyphenylenes", Journal of Cellular Plastics, 41(1),pages 29-39, cites as potential applications of Parmax® SRPs materials (now marketed as Primospire SRPs), fire resistant structures, additives to enhance the properties of polymers, high performance films and abrasion resistance coatings. Then, this publication addresses a new method for making foams, for which experiments made using an experimental specific kinked rigid-rod polyphenylene supplied by Mississippi Polymer Technologies, namely Parmax® 1500 (still now at the developmental stage, and available from SOLVAY ADVANCED POLYMERS as PRIMOSPIRE™ PR-250 polyphenylene). This publication does neither describe the use of PRIMOSPIRE™ PR-250 and type specifically as fire-stabilizer, or for making films or coatings, nor does it suggest any merit that would result in the use of this specific type of polyarylene for the previously cited specific end uses.

Similarly, U.S. Pat. No. 5,886,130 describes and exemplifies (notably in example 5) certain kinked rigid-rod polyarylenes of the same type as PRIMOSPIRE™ PR-250, characterized by a high amount of kink-forming recurring units. The same patent describes and exemplifies (notably in example 11) certain other kinked rigid-rod polyarylenes characterized by a low amount of kink-forming recurring units, the only broadly commercially available representative of this class is PRIMOSPIRE™ PR-120 polymer (formerly, PARMAX® 1200). Among other possible applications of the kinked rigid-rod polyarylenes described in U.S. Pat. No. '130, are fiber coatings, fibers, films and sheets. This publication does neither describe the use of a specific type of kinked rigid-rod polyarylene rich in kink-forming units specifically as fire-stabilizer, or for making films or coatings, nor does it suggest any merit that would result in the use of this specific type of polyarylene for the previously cited specific end uses.

Back to PRIMOSPIRE™ PR-120 polyarylene specifically. It is known that PRIMOSPIRE™ PR-120 polymer can be used as a inherently fire-resistant material and can further significantly improve the fire-resistance properties of other polymers. It is also known to use such Primospire™ PR-120 polyarylene, as base polymer on as additive to compositions based on other polymers, for the manufacture of certain ultrathin shaped articles such as films and coatings, for which the fire-resistance is generally considered as a key property by the skilled in the art, because, despite of their thinness, said films and coatings represent generally the first effective barrier against a potentially external aggressive environment.

While PRIMOSPIRE™ PR-120 polyarylene does well provide the expected level of fire resistance in certain application, PRIMOSPIRE™ PR-120 polyarylene does not offer a level of fire resistance as high as needed in certain other more demanding applications, as those which may be found in aircraft and civil transportations. As an immediate result thereof and also since films and coatings made from PRIMOSPIRE™ PR-120 polyarylene are prone to various surface defects, there is still a strong need in fire-retarded applications for a material offering an increased fire-resistance when compared to the prior art polyarylenes, in particular PRIMOSPIRE™ PR-120 polyarylene, and which makes it then possible to make fire-retarded films and coatings exhibiting an increased fire resistance, and, desirably also, an improved surface aspect.

THE INVENTION

It has been surprisingly found that kinked rigid-rod polyarylenes of a specific type, which comprise a substantially higher amount of kink-forming arylene units than Primospire™ PR-120 polyarylene does, exhibit inherently or provide as additives improved fire-resistance properties, resulting notably in a reduced burn time, and/or reduced peak heat release rate and/or reduced smoke generation.

It has also been surprisingly found that the same kinked rigid-rod polyarylenes, which comprise a substantially higher amount of kink-forming arylene units than Primospire™ PR-120 polyarylene does, are especially well suited for making films and coatings exhibiting an increased fire resistance.

It has also been surprisingly found that the films and coatings made from these kinked rigid-rod polyarylenes, are much less prone to surface defects and usually provide smooth films and coatings, essentially free of surface defects.

The Presently Invented Uses

Thus, an aspect of the present invention is the use of at least one kinked rigid-rod polyarylene (P) of which more than 50 wt. % of the recurring units are recurring units (R) of one or more formulae consisting of an optionally substituted arylene group, provided said optionally substituted arylene group is linked by each of its two ends to two other optionally substituted arylene groups via a direct C—C linkage, said recurring units (R) being a mix (M) consisting of:
  between 0 and 75 mole %, based on the total number of moles of the recurring units (R), of rigid rod-forming arylene units (Ra), said rigid rod-forming arylene units (Ra) being optionally substituted by at least one monovalent substituting group,
with
  between 25 and 100 mole %, based on the total number of moles of the recurring units (R), of kink-forming arylene units (Rb), said kink-forming arylene units (Rb) being optionally substituted by at least one monovalent substituting group,
for its fire resistance properties.

In a certain embodiment (Emb-1) of the present invention, the kinked rigid-rod polyarylene (P) is used as fire-stabilizer additive of a thermoplastic polymer material (TM) comprising, as base polymer, at least one thermoplastic polymer (T) other than the kinked rigid-rod polyarylene (P).

That the kinked rigid-rod polyarylene (P) is used as additive of the thermoplastic polymer material (TM), means that the weight amount of the kinked rigid-rod polyarylene (P) is below 50%, based on the total weight of the thermoplastic polymer material (TM).

That the thermoplastic polymer (T) is used as base polymer of the thermoplastic polymer material (TM), means that the weight amount of the thermoplastic polymer (T) is above 50%, based on the total weight of the thermoplastic polymer material (TM).

As used herein, the total weight of the thermoplastic polymer material (TM) is the sum of the weight of the thermoplastic polymer (T), of the kinked rigid-rod polyarylene (P) and of further optional ingredients, if any. It thus includes notably the weight of the kinked rigid-rod polyarylene (P).

According to (Emb-1), the weight amount of the kinked rigid-rod polyarylene (P), based on the total weight of the thermoplastic polymer material (TM), is preferably of at most 40%, more preferably of at most 30%, still more preferably of at most 25% and most preferably of at most 20%. Besides, according to (Emb-1), the weight amount of the kinked rigid-rod polyarylene (P), based on the total weight of the thermoplastic polymer material (TM), is advantageously of at least 1%, preferably at least 2.5%, more preferably at least 5%, and still more preferably at least 10%.

According to (Emb-1), the weight amount of the thermoplastic polymer (T), based on the total weight of the thermoplastic polymer material (TM), is preferably of at least 60%, more preferably of at least 70%, still more preferably of at least 75% and most preferably of at least 80%. Besides, according to (Emb-1), the weight amount of the thermoplastic polymer (T), based on the total weight of the thermoplastic polymer material (TM), is advantageously of at most 99%, preferably at most 97.5%, more preferably at most 95%, and still more preferably at most 90%.

Any thermoplastic polymer (T) other than the kinked rigid-rod polyarylene (P) is suitable for the presently invented use.

The thermoplastic polymer (T) is preferably an engineering polymer. Engineering polymers are thermoplastics that maintain dimensional stability and most mechanical properties above 80° C. and below 0° C.; engineering polymers can be formed into functional parts that can bear loads and withstand abuse in temperature environments commonly experienced by traditional engineering materials, such as wood, metals, glass, and ceramics. Aromatic polycondensation polymers, in particular, are engineering polymers that provide high temperature service, high strength, and chemical resistance. Aromatic polycondensation polymers are polymers formed by the condensation reaction of at least two monomers, more than 50 wt. % of the monomers, based on the total weight of the monomers, comprise at least one aromatic ring.

The thermoplastic polymer (T) is more preferably chosen from high temperature polycondensation polymers. High temperature polycondensation polymers are defined as polycondensation polymers that have a heat deflection temperature (HDT) of above 80° C. under a load of 1.82 MPa when measured according to ASTM D-648. Typical heat deflection temperatures of certain polycondensation polymers are listed in the below table.

TABLE

HDT of certain high temperature polycondensation polymers

| Polycondensation Polymer | Heat Deflection Temp. (° C.) |
| --- | --- |
| Polysulfone | 174 |
| Polyethersulfone | 203 |
| Polyphenylsulfone | 204 |
| Polyphthalamide | 120 |
| Polyamideimide | 278 |
| Liquid crystalline polymers (LCP) (there are several types of LCPs) | 180-310 |
| Polyimide | 360 |
| Polyetherimide | 200 |
| Polyetheretherketone (low flow) | 160 |
| Polyetheretherketone (high flow) | 171 |
| Polyphenylene sulfide | 135 |
| Polycarbonate | 132 |

Heat deflection temperatures of polymers and polymer compositions are determined according to ASTM D648, Method A, using a span of 4 inches. The polymer is injection molded into plaques that are 5 inches long, ½ inch wide, and ⅛ inch thick. The plaques are immersed in a suitable liquid heat-transfer medium, such as an oil, during the HDT test. Dow Corning 710 silicone oil, for example, may be used. The HDT test may be performed on unannealed specimens.

The HDT of the thermoplastic polymer (T) is preferably above 100° C. and more preferably above 120° C.

A certain class of thermoplastic polymers (T) for which excellent results were obtained are aromatic polyetherimides.

For the purpose of the present invention, an aromatic polyetherimide is intended to denote any polymer of which more than 50 wt. % of the recurring units are recurring units (R-PEI) comprising at least one aromatic ring, at least one ether group and at least one imide group, as such

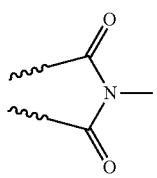

and/or in its amic acid form

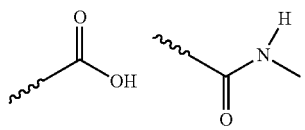

Preferred aromatic polyetherimides as the thermoplastic polymer (T) are those wherein the recurring units (R-PEI) are recurring units:

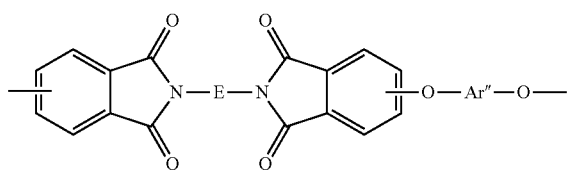

as such, and/or in their amic acid forms

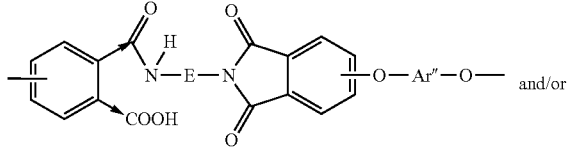

and/or

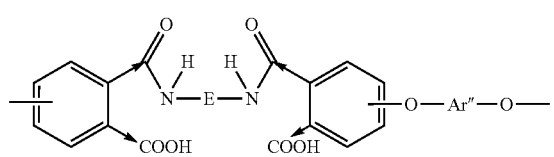

wherein:
the → denotes isomerism so that in any recurring unit the groups to which the arrows point may exist as shown or in an interchanged position;
E is chosen from:

(E-i)

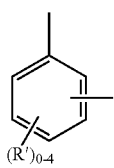

with the R' being, independently from each other, alkyl radicals comprising from 1 to 6 carbon atoms, aryls or halogens;

(E-ii)

with n=integer from 1 to 6;

(E-iii)

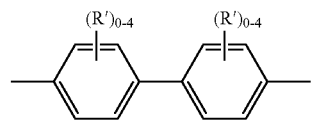

with the R' being, independently from each other, alkyl radicals comprising from 1 to 6 carbon atoms, aryls or halogens;

(E-iv)

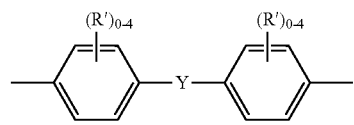

with the R' being, independently from each other, alkyl radicals comprising from 1 to 6 carbon atoms, aryls or halogens;
and Y being chosen from:
(Y-i) alkylenes of 1 to 6 carbon atoms, in particular

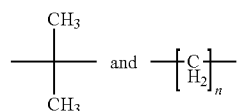

with n=integer from 1 to 6,
(Y-ii) perfluoroalkylenes of 1 to 6 carbon atoms, in particular

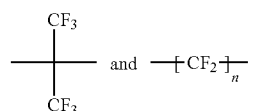

with n=integer from 1 to 6,
(Y-iii) cycloalkylenes of 4 to 8 carbon atoms;
(Y-iv) alkylidenes of 1 to 6 carbon atoms;
(Y-v) cycloalkylidenes of 4 to 8 carbon atoms;

(Y-vi)

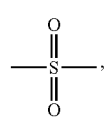

(Y-vii)

(Y-viii)

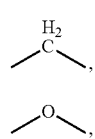

-continued

(Y-x)

Ar" is selected from:
(Ar"-i) aromatic hydrocarbon radicals having from 6 to 20 carbon atoms and halogenated substituted thereof, or alkyl substituted derivatives thereof, wherein the alkyl substituting group contains 1 to 6 carbon atoms, such as:

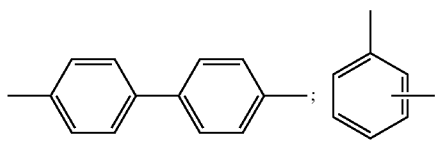

and halogenated substituted thereof, or alkyl substituted derivatives thereof, wherein the alkyl substituting group contains from 1 to 6 carbon atoms;

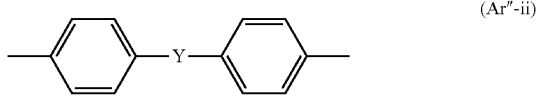
(Ar"-ii)

with Y being chosen from (Y-i), (Y-ii), (Y-iii), (Y-iv), (Y-v), (Y-vi), (Y-vii), (Y-viii), (Y-ix) and (Y-x), as above defined,
(Ar"-iii) alkylene and cycloalkylene radicals having from 2 to 20 carbon atoms, and
(Ar"-iv) terminated polydiorganosiloxanes.

More preferred aromatic polyetherimides as the thermoplastic polymer (T) are those wherein the recurring units (R-PEI) are recurring units:

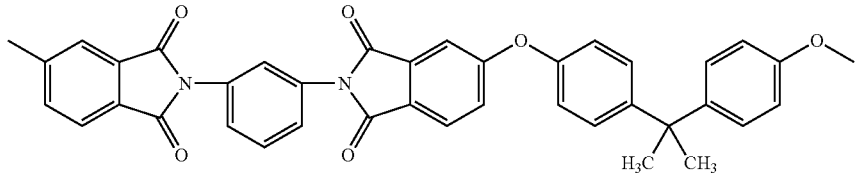

as such, and/or in their amic acid forms:

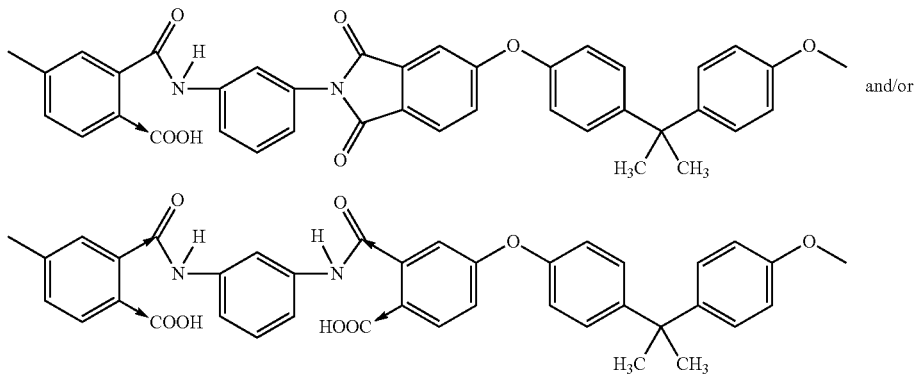

wherein the → denotes isomerism so that in any recurring unit the groups to which the arrows point may exist as shown or in an interchanged position.

Preferably more than 75 wt. % and more preferably more than 90 wt. % of the recurring units of the aromatic polyetherimide are recurring units (R-PEI). Still more preferably, essentially all, if not all, the recurring units of the aromatic polyimide are recurring units (R-PEI).

In particular, excellent results were obtained when using as the thermoplastic polymer (T) ULTEM® aromatic polyetherimides, commercially available form General Electric.

Another class of thermoplastic polymers (T) for which excellent results were obtained are aromatic polycarbonates.

For the purpose of the present invention, an aromatic polycarbonate is any polymer of which more than 50 wt. % of the recurring units are recurring units (R-PC) comprising at least one optionally substituted arylene group, as hereinafter defined for the polyarylene (P2), and at least one carbonate group (—O—C(=O)—O).

The recurring units (R-PC) are preferably chosen from those obtainable by the polycondensation reaction of phosgene and at least one aromatic diol (D-PC):

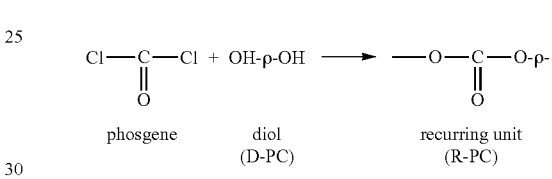

ρ being a $C_6$-$C_{50}$ divalent radical.

The aromatic diol (D-PC) from which the recurring units (R-PC) are obtainable by its polycondensation reaction with phosgene, is preferably chosen from aromatic diols conforming to the structural formulae (I-PC) and (II-PC), as shown herebelow:

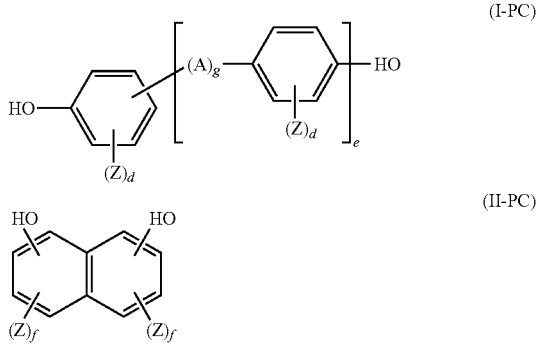

wherein:
A is chosen from $C_1$-$C_8$ alkylenes, $C_2$-$C_8$ alkylidenes, $C_5$-$C_{15}$ cycloalkylenes, $C_5$-$C_{15}$ cycloalkylidenes, carbonyl atom, oxygen atom, sulfur atom, —SO—, —$SO_2$— and radicals conforming to

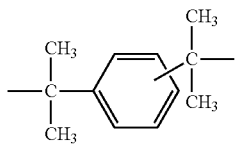

Z is chosen from F, Cl, Br, I, $C_1$-$C_4$ alkyls; if several Z radicals are substituents, they may be identical or different from one another;
e denotes an integer from 0 to 1;
g denotes an integer from 0 to 1;
d denotes an integer from 0 to 4; and
f denotes an integer from 0 to 3.

The most preferred aromatic diol (D-PC) from which the recurring units (R-PC) are obtainable is 2,2-bis-(4-hydroxyphenyl)-propane (bisphenol A).

Preferably more than 75 wt. % and more preferably more than 90 wt. % of the recurring units of the aromatic polycarbonate are recurring units (R-PC). Still more preferably, essentially all, if not all, the recurring units of the aromatic polycarbonate are recurring units (R-PC).

In particular, excellent results were obtained when using as the thermoplastic polymer (T) LEXAN® 104 aromatic polycarbonate, commercially available form General Electric.

As conventional optional ingredients of the thermoplastic material (T), it can be cited notably fibrous reinforcing agents, particulate fillers and nucleating agents such as talc and silica, adhesion promoters, compatibilizers, curing agents, lubricants, metal particles, mold release agents, organic and/or inorganic pigments like $TiO_2$ and carbon black, dyes, flame retardants, smoke-suppressing agents, heat stabilizers, antioxidants, UV absorbers, tougheners such as rubbers, plasticizers, anti-static agents, melt viscosity depressants such as liquid crystalline polymers and the like.

In general, the weight of said optional ingredients, based on the total weight of the thermoplastic material (TM) is advantageously below 75%, preferably below 50%, more preferably below 25% and still more preferably below 10%. Excellent results were obtained when the thermoplastic material (TM) was essentially free, or even was completely free, of said optional ingredients.

In another embodiment of the present invention (Emb-2), the kinked rigid-rod polyarylene (P) is used as self fire-resistant material (SM=P) or as base polymer of a self fire-resistant material (SM).

That the kinked rigid-rod polyarylene (P) is used as self-fire resistant material (SM=P) means that it is used as such, in the absence of any other ingredient.

That the kinked rigid-rod polyarylene (P) is used as base polymer of a self-fire resistant material (SM), means that the weight amount of the kinked rigid-rod polyarylene (P), based on the total weight of the self-fire resistant material (SM) is above 50%, but less than 100%. Thus, other ingredients such as at least one thermoplastic polymer (T) as above defined and/or conventional ingredients of thermoplastic compositions, are present in the self-fire resistant material (SM).

As used herein, the total weight of the self-fire resistant material (SM) is the sum of the weight of the kinked rigid-rod polyarylene (P) and of the other ingredients contained in self-fire resistant material (SM).

The weight amount of the kinked rigid-rod polyarylene (P), based on the total weight of the self-fire resistant material (SM), is preferably of at least 60%. It is very often of at least 70%, and often of at least 80% or sometimes of at least 90%.

In a particular embodiment, the self-fire resistant material (SM) or the thermoplastic polymer material (TM) further contains an additive capable of promoting the formation of a char layer when (SM) or (TM) is in contact with the flames of a fire [hereinafter, "char promoter"]; without being bound by any theory, the char layer would protect the core of polymer composition, slowing down its degradation. The char promoter may be an organic compound, such as a phenoxy derivative ; alternatively, it may be inorganic, such as an oxide, a salt, or a combination thereof. The char promoter is preferably a combination of one or more oxides and one or more salts. Besides, the char promoter is preferably composed of one or more oxides, salts or combinations thereof, of one or more elements of families 3 to 12 of the Periodic Table of the Elements, more preferably of one or more elements of families 6, 7 and 11, and still more preferably of one or more elements selected from the group of Cr, Mo, W, Mn, Cu and Ag. Excellent results in terms of fire resistance were obtained when using $CuCr_2O_4.MnO$ as the char promoter. $CuCr_2O_4.MnO$ is notably commercially available as Engelhard Meteor Plus 9875 Black brand pigment. In this particular embodiment, (SM) or (TM) comprises generally between 0.01 and 10 wt. % of the char promoter, based on the total weight of the polymer composition. The char promoter amount is preferably of at least 0.1 wt. %, and very preferably of at least 0.2 wt. %; besides, it is preferably of at most 5 wt. %, and very preferably of at most 2 wt. %.

The fire resistance properties may be assessed by any conventional means, and expressed in any conventional terms.

The fire resistance properties are preferably expressed in terms of reduced burn time, reduced peak heat release rate and/or reduced smoke generation.

For example, the burn time can be determined by the UL 94 Vertical Burn Method, using 10 specimens, all of them being 3.2 mm in thickness, while the peak heat release rate can be determined by the cone Calorimetry method in accordance with ASTM E-1354.

Another aspect of the present invention is a film or a coating consisting of a material comprising at least one kinked rigid-rod polyarylene of a specific type, namely the kinked rigid-rod polyarylene (P) as above defined.

The film or the coating may consist of:
either the kinked rigid-rod polyarylene (P), as above defined;
or the self-fire resistant material (SM) as above defined, i.e. a material comprising, as base polymer, the kinked rigid-rod polyarylene (P) as above defined, and at least one other ingredient, such as those above defined;

or the thermoplastic polymer material (TM) as above defined, i.e. a material comprising the kinked-rigid rod polyarylene (P) as above defined and, as base polymer, the thermoplastic polymer (T), as above defined, other than the kinked rigid-rod polyarylene (P).

The thickness (t) of the film or of the coating is advantageously defined as:

$$t = \int^V \tau(x,y,z) dx\, dy\, dz / V,$$

wherein x, y and z are the coordinates in a three-dimensional space of an elementary volume dV (dV being equal to dx times dy times dz) of the film or the coating of overall plain volume V, and τ is the local thickness.

The local thickness τ, associated to a material point of coordinates (x,y,z), is defined as the length of the shortest straight line D including the material point of concern, which goes right through the film or the coating (i.e. which goes from the material point where D enters the film or the coating to the material point where D exits the film or the coating).

The thickness of the film or the coating is usually of at least 1 μm, preferably of at least 5 μm, more preferably of at least 10 μm, and still more preferably of at least 20 μm. Besides, the thickness of the film or the coating is usually of at most 1000 μm, preferably of at most 500 μm, more preferably of at most 400 μm, and still more preferably of at most 300 μm. In certain embodiments, the thickness of the film or the coating may be of no more than 200 μm, and even non more than 100 μm.

It will be understood that the film according to the instant invention is not coated on a substrate.

In contrast, the coating according to the instant invention is coated on a substrate. The expression "coated on a substrate" should be understood in its common sense, i.e. that the coating forms a cover over the surface of a substrate, thereby without including any limitation as to the process used to achieve the coating. The surface of the substrate may be partly or completely covered by the coating.

An aspect of the present invention is an article comprising a substrate, onto which the coating as above described is coated.

A particular aspect of the present invention of particularly high technical interest is directed to the use of the coating as above described, for ablative insulation. Accordingly, the coating is coated on a substrate such as a metal, and the coating is submitted to an aggressive agent which destroys partly or completely the coating; the coating is then used as a "sacrificed" layer, to protect the substrate against the aggressive agent. A first type of aggressive agent is a body which is in relative motion with regard to the coating and rubs against it; the body is usually more abrasive than the coating itself. Another type of aggressive agent lies in flames, which may originate from uncontrolled or controlled fires, in particular from the deliberate combustion of fuels. Still another type of aggressive agent is chosen from chemicals. Combinations of these different types of aggressive agents are also encompassed.

The film or coating according to the present invention may be prepared by any known technique. The coating may be prepared notably by solution processing or spray processing. The film may be prepared notably by solution processing or by melt processing.

Solution processing uses generally an organic liquid as solvent, the said solvent dissolving advantageously the kinked rigid-rod polyphenylene.

Films may be extruded from the melt through a slit. Films be formed by blow extrusion. Films may be further processed by stretching and/or annealing. Special films such as bilayers, laminates, porous films, textured films and the like may be produced by techniques known in the art.

Films may be oriented by stretching. Stretching along one dimension will result in uniaxial orientation. Stretching in two dimensions will give biaxial orientation. Stretching may be aided by heating near the glass transition temperature. Stretching may also be aided by plasticizers. More complex processes such as applying alternating cycles of stretching and annealing may also be used with the blends of the present invention.

A last aspect of the present invention is to a method for preparing a thermoplastic polymer material (TM) comprising, as base polymer, at least one thermoplastic polymer (T), said thermoplastic polymer material (TM) exhibiting increased fire resistance, wherein the thermoplastic polymer (T) is blended in the need thereof with at least one fire-stabilizer additive chosen from kinked rigid-rod polyarylenes (P), other than the thermoplastic polymer (T), more than 50 wt. % of the recurring units of the kinked rigid-rod polyarylenes (P) being recurring units (R) of one or more formulae consisting of an optionally substituted arylene group, provided said optionally substituted arylene group is linked by each of its two ends to two other optionally substituted arylene groups via a direct C—C linkage, said recurring units (R) being a mix (M) consisting of:
  between 0 and 75 mole %, based on the total number of moles of recurring units (R), of rigid rod-forming arylene units (Ra), said rigid rod-forming arylene units (Ra) being optionally substituted at least one monovalent substituting group
with
  between 25 and 100 mole % of kink-forming arylene units (Rb), said kink-forming arylene units being optionally substituted or not by at least one monovalent substituting group.

The Kinked Rigid-Rod Polyarylene Suitable for the Presently Invented Uses

For the purpose of the present invention, an arylene group is a hydrocarbon divalent group consisting of one core composed of one benzenic ring or of a plurality of benzenic rings fused together by sharing two or more neighboring ring carbon atoms, and of two ends.

Non limitative examples of arylene groups are phenylenes, naphthylenes, anthrylenes, phenanthrylenes, tetracenylenes, triphenylylenes, pyrenylenes, and perylenylenes. The arylene groups (especially the numbering of the ring carbon atoms) were named in accordance with the recommendations of the CRC Handbook of Chemistry and Physics, $64^{th}$ edition, pages C1-C44, especially p. C11-C12.

Arylene groups present usually a certain level of aromaticity; for this reason, they are often reported as "aromatic" groups. The level of aromaticity of the arylene groups depends on the nature of the arylene group; as thoroughly explained in Chem. Rev. 2003, 103, 3449-3605, "Aromaticity of Polycyclic Conjugated Hydrocarbons", the level of aromaticity of a polycyclic aromatic hydrocarbon can be notably quantified by the "index of benzene character" B, as defined on p. 3531 of the same paper; values of B for a large set of polycyclic aromatic hydrocarbon are reported on table 40, same page.

An end of an arylene group is a free electron of a carbon atom contained in a (or the) benzenic ring of the arylene group, wherein an hydrogen atom linked to said carbon atom has been removed. Each end of an arylene group is capable of forming a linkage with another chemical group. An end of an arylene group, or more precisely the linkage capable of being formed by said end, can be characterized by a direction and by a sense; to the purpose of the present invention, the sense of the end of an arylene group is defined as going from the inside of the core of the arylene group to the outside of said core. As concerns more precisely arylene groups the ends of which have the same direction, such ends can be either of the same or opposite sense; also, their ends can be in the straight foregoing of each other, or not (otherwise said, they can be disjoint).

A polyarylene is intended to denote a polymer of which more than 50 wt. % of the recurring units are recurring units (R) of one or more formulae consisting of an optionally substituted arylene group, provided said optionally substituted arylene group is linked by each of its two ends to two other optionally substituted arylene groups via a direct C—C linkage. That the optionally substituted arylene group is linked by each of its two ends to two other optionally substituted arylene groups via a direct C—C linkage, is an essential feature of the recurring units (R); thus, an arylene recurring unit which is linked by at least one of its two ends to a group other than an arylene group such as phenylene recurring units $\phi_1$, $\phi_2$ and $\phi_{2'}$ below:

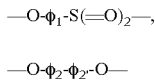

are not recurring units (R) in the sense of the present invention.

The arylene groups of which the recurring units (R) consist can be unsubstituted. Alternatively, they can be substituted by at least one monovalent substituting group.

The monovalent substituting group is usually not polymeric in nature; its molecular weight is preferably below 500, more preferably below 300, still more preferably below 200 and most preferably below 150.

The monovalent substituting group is advantageously a solubilizing group. A solubilizing group is one increasing the solubility of the polyarylene in at least one organic solvent, in particular in at least one of dimethylformamide, N-methylpyrrolidinone, hexamethylphosphoric triamide, benzene, tetrahydrofuran and dimethoxyethane, which can be used as solvents during the synthesis of the polyarylene by a solution polymerization process.

The monovalent substituting group is also advantageously a group which increases the fusibility of the polyarylene, i.e. it lowers its glass transition temperature and its melt viscosity, so as to desirably make the polyarylene suitable for thermoprocessing.

Preferably, the monovalent substituting group is chosen from:
  hydrocarbyls such as alkyls, aryls, alkylaryls and aralkyls;
  halogenos such as —Cl, —Br, —F and —I;
  hydrocarbyl groups partially or completely substituted by at least one halogen atom such as halogenoalkyls, halogenoaryls, halogenoalkylaryls and halogenoaralkyls;
  hydroxyl;
  hydrocarbyl groups substituted by at least one hydroxyl group, such as hydroxyalkyls, hydroxyaryls, hydroxyalkylaryls and hydroxyaralkyls;
  hydrocarbyloxys [—O—R, where R is a hydrocarbyl group], such as alkoxys, aryloxys, alkylaryloxys and aralkyloxys;
  amino (—NH$_2$);
  hydrocarbyl groups substituted by at least one amino group, such as aminoalkyls and aminoaryls;
  hydrocarbylamines [—NHR or —NR$_2$, where R is a hydrocarbyl group] such as alkylamines and arylamines;
  carboxylic acids and their metal or ammonium salts, carboxylic acid halides, carboxylic anhydrides;
  hydrocarbyl groups substituted by at least one of carboxylic acids, metals or ammonium salts thereof, carboxylic acid halides and carboxylic anhydrides, such as —R—C(=O)OH where R is an alkyl or an aryl group;
  hydrocarbylesters [—C(=O)OR or —O—C(=O)R, where R is a hydrocarbyl group] such as alkylesters, arylesters, alkylarylesters and aralkylesters;
  amido [—C(=O)NH$_2$];
  hydrocarbyl groups substituted by at least one amido group;
  hydrocarbylamide monoesters [—C(=O)NHR or —NH—C(=O)—R, where R is a hydrocarbyl group], such as alkylamides, arylamides, alkylarylamides and aralkylamides, and hydrocarbylamide diesters [—C(=O)NR$_2$ or —N—C(=O)R$_2$, where R are a hydrocarbyl groups], such as dialkylamides and diarylamides;
  sulfinic acid (—SO$_2$H), sulfonic acid (—SO$_3$H), their metal or ammonium salts,
  hydrocarbylsulfones [—S(=O)$_2$—R, where R is the hydrocarbyl group], such as alkylsulfones, arylsulfones, alkylarylsulfones, aralkylsulfones;
  aldehyde [—C(=O)H] and haloformyls [—C(=O)X, wherein X is a halogen atom];
  hydrocarbylketones [—C(=O)—R, where R is a hydrocarbyl group], such as alkylketones, arylketones, alkylarylketones and aralkylketones;
  hydrocarbyloxyhydrocarbylketones [—C(=O)—R$^1$—O—R$^2$, where R$^1$ is a divalent hydrocarbon group such as an alkylene, an arylene, an alkylarylene or an aralkylene, preferably a C$_1$-C$_{18}$ alkylene, a phenylene, a phenylene group substituted by at least one alkyl group, or an alkylene group substituted by at least one phenyl group; and R$^2$ is a hydrocarbyl group, such as an alkyl, aryl, alkylaryl or aralkyl group], such as alkyloxyalkylketones, alkyloxyarylketones, alkyloxyalkylarylketones, alkyloxyaralkylketones, aryloxyalkylketones, aryloxyarylketones, aryloxyalkylarylketones and aryloxyaralkylketones;
  any of the above groups comprising at least one hydrocarbyl group or a divalent hydrocarbon group R$^1$, wherein said hydrocarbyl group or said R$^1$ is itself substituted by at least one of the above listed monovalent substituting groups, e.g. an arylketone —C(=O)—R, where R is an aryl group substituted by one hydroxyl group;
where:
  the hydrocarbyl groups contain preferably from 1 and 30 carbon atoms, more preferably from 1 to 12 carbon atoms and still more preferably from 1 to 6 carbon atoms;
  the alkyl groups contain preferably from 1 to 18 carbon atoms, and more preferably from 1 to 6 carbon atoms; very preferably, they are chosen from methyl, ethyl, n-propyl, isopropyl, n-butyl, isobutyl and tert-butyl;
  the aryl groups are defined as monovalent groups consisting of one end and one core composed of one benzenic ring (such the phenyl group) or of a plurality of benzenic rings directly linked to each other via a carbon-carbon linkage (such as the biphenyl group) or fused together by sharing two or more neighboring ring carbon atoms (such as the naphthyl groups), and wherein the ring carbon atoms are possibly substituted by at least one nitrogen, oxygen or sulfur atom; preferably, in the aryl groups, no ring carbon atom is substituted;
  the aryl groups contain preferably from 6 to 30 carbon atoms; more preferably, they are phenyl groups;

the alkyl group which is contained in the alkylaryl groups meets the preferences of the alkyl groups as above expressed;

the aryl group which is contained in the aralkyl groups meets the preferences of the aryl groups as above expressed.

More preferably, the monovalent substituting group is chosen from hydrocarbylketones [—C(=O)—R, where R is a hydrocarbyl group] and hydrocarbyloxyhydrocarbylketones [—C(=O)—R$^1$—O—R$^2$, where R$^1$ is a divalent hydrocarbon group and R$^2$ is a hydrocarbyl group], said hydrocarbylketones and hydrocarbyloxyhydrocarbylketones being unsubstituted or substituted by at least one of the above listed monovalent substituting groups.

Still more preferably, the monovalent substituting group is chosen from arylketones and aryloxyarylketones, said arylketones and aryloxyarylketones being unsubstituted or substituted by at least one of the above listed monovalent substituting groups.

Most preferably, the monovalent substituting group is an (unsubstituted) arylketone, in particular it is phenylketone [—C(=O)-phenyl].

The core of the optionally substituted arylene group of the recurring units (R) is composed of preferably at most 3, more preferably at most 2, and still more preferably at most one benzenic ring. Then, when the core of the optionally substituted arylene group of the recurring units (R) is composed of one benzenic ring, the recurring units (R) are of one or more formulae consisting of an optionally substituted phenylene group, provided said optionally substituted phenylene group is linked by each of its two ends to two other optionally substituted arylene groups via a direct C—C linkage.

As above explained, the optionally substituted arylene group of the recurring units (R) is linked by each of its two ends to two other optionally substituted arylene groups via a direct C—C linkage. Preferably, it is linked by each of its two ends to two other optionally substituted phenylene groups via a direct C—C linkage.

As also above explained, both ends of the optionally substituted arylene group of the recurring units (R) can be characterized notably by a direction and by a sense.

A first set of recurring units (R) is composed of optionally substituted arylene groups, the ends of which
have the same direction,
are of opposite sense, and
are in the straight foregoing of each other
[hereafter, rigid rod-forming arylene units (Ra)].

Non limitative examples of such optionally substituted arylene groups include:

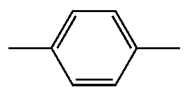

1,4-phenylene
(also named p-phenylene)

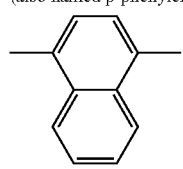

1,4-naphtylene

-continued

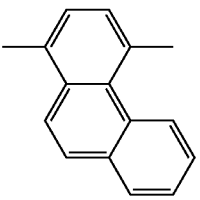 and 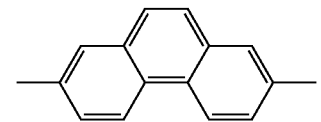

1,4-phenanthrylene and 2,7-phenanthrylene

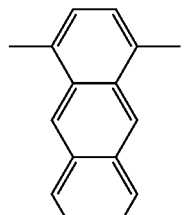 and 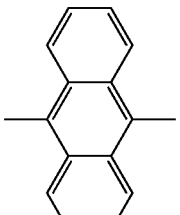

1,4-anthrylene and 9,10-anthrylene

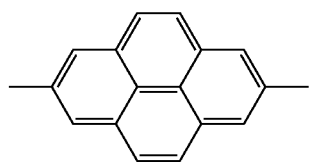

2,7-pyrenylene

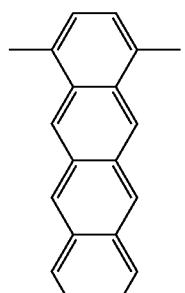 and 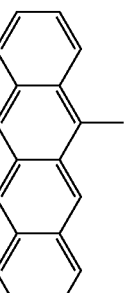

1,4-naphthacenylene and 5,12-naphthacenylene

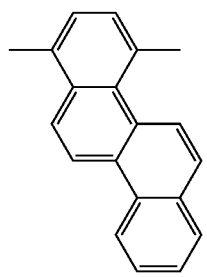

1,4-chrysenylene

 and 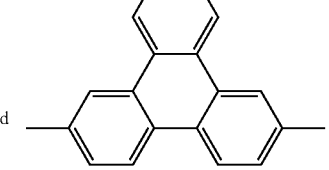

1,4-triphenylylene and 2,7-triphenylylene

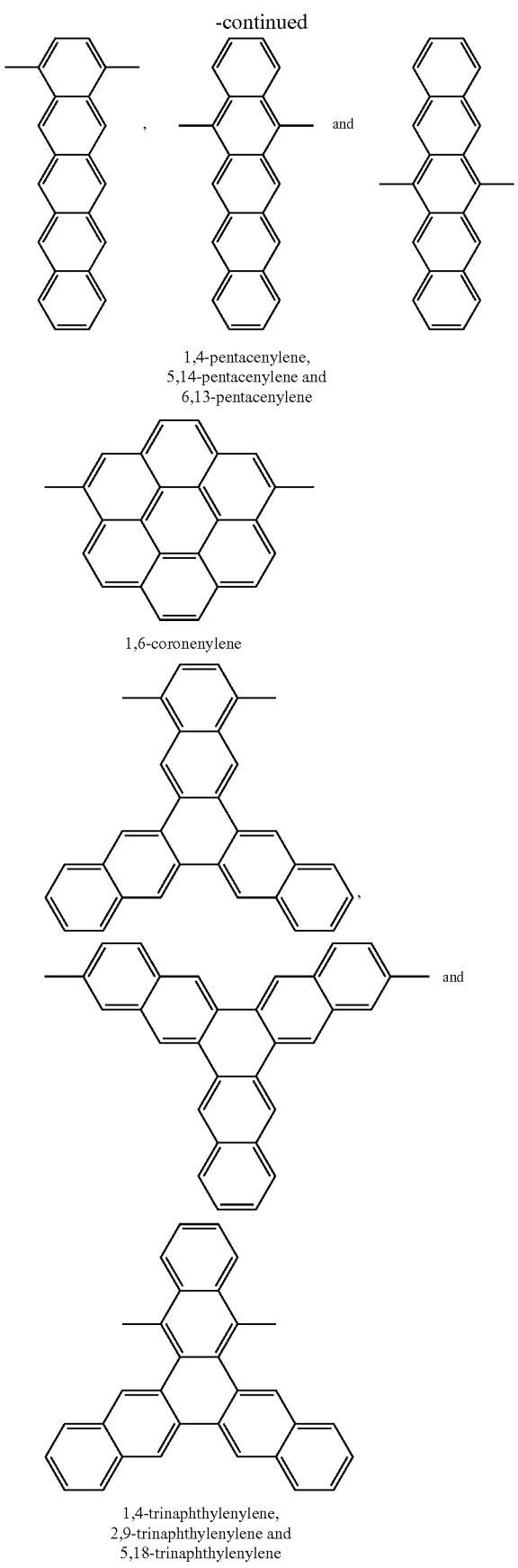

1,4-pentacenylene,
5,14-pentacenylene and
6,13-pentacenylene 1,6-coronenylene 1,4-trinaphthylenylene,
2,9-trinaphthylenylene and
5,18-trinaphthylenylene and any of these groups substituted by at least one monovalent substituting group, as above defined, in particular by a phenylketone group.

Optionally substituted p-phenylenes are preferred as rigid rod-forming arylene units (Ra).

Rigid rod-forming arylene units (Ra), when contained in the polyarylenes, result in straight polymer chains exhibiting an outstanding rigidity. For this reason, such polyarylenes are commonly referred to as "rigid-rod polymers".

A second set of recurring units (R) is composed of optionally substituted arylene groups, the ends of which either have a different direction, forming thus together an angle between 0 and 180°, said angle being possibly acute or obtuse, or have the same direction and the same sense, or have the same direction, are of opposite sense and are disjoint (i.e. not in the straight foregoing of each other)

[globally hereafter referred to as kink-forming arylene units (Rb)].

Then, a first subset of kink-forming arylene units (Rb) is composed of optionally substituted arylene groups, the ends of which have a different direction, forming together an acute angle [kink-forming arylene units (Rb-1)]. Non limitative examples of optionally substituted arylene groups the ends of which have a direction different from each other include:

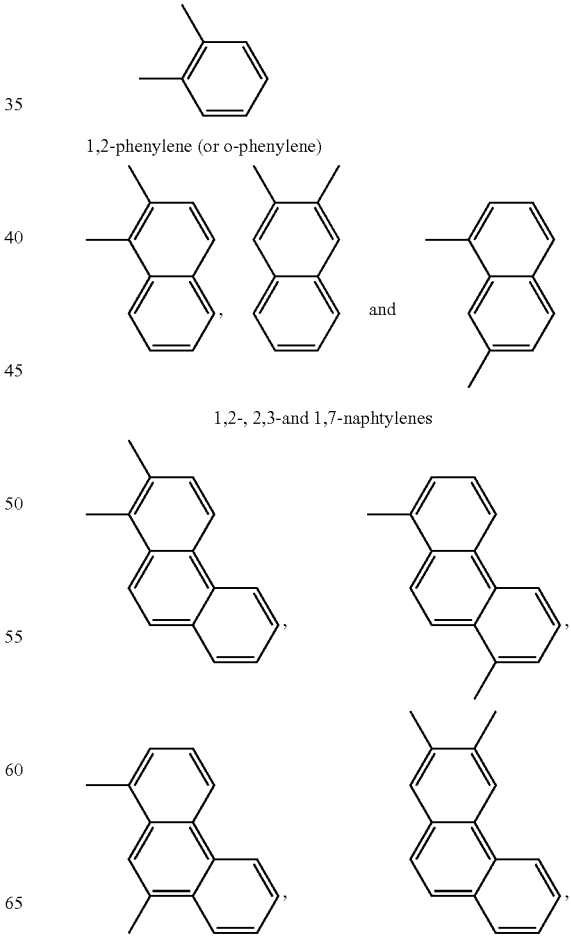

1,2-phenylene (or o-phenylene)

1,2-, 2,3- and 1,7-naphtylenes

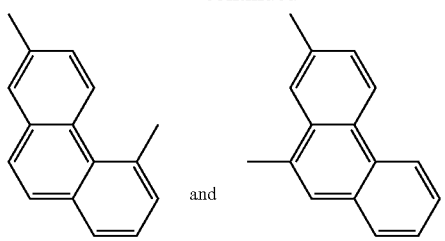

1,2-, 1,8-, 1,9-, 2,3-, 2,5- and 2,10-phenanthrylenes

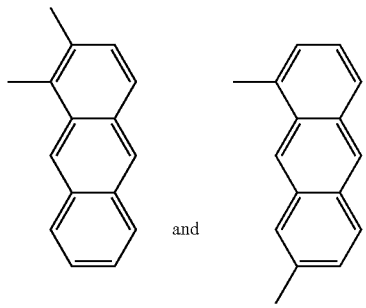

1,2- and 1,7-anthrylenes and any of these groups substituted by at least one monovalent substituting group, as above defined, in particular by a phenylketone group.

A second subset of kink-forming arylene units (Rb) is composed of optionally substituted arylene groups, the ends of which have a different direction, forming together an obtuse angle [kink-forming units (Rb-2)]. Non limitative examples of optionally substituted arylene groups the ends of which have a direction different from each other include:

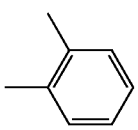

1,3-phenylene (or m-phenylene)

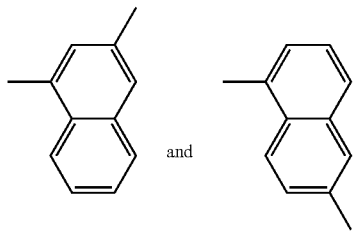

1,3- and 1,6-naphtylenes

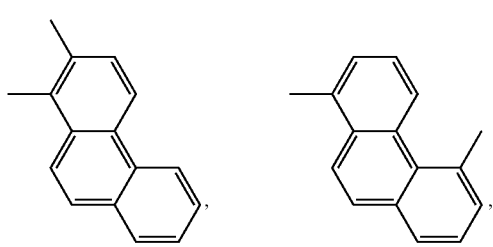

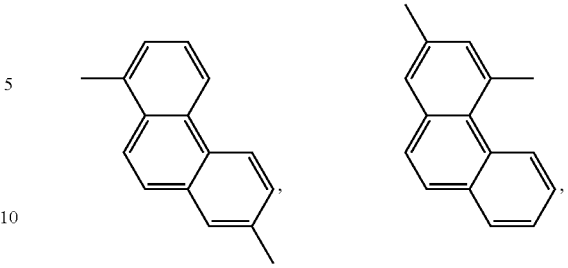

1,3-, 1,5-, 1,7-, 2,4-, 2,9- and 3,10-phenanthrylenes

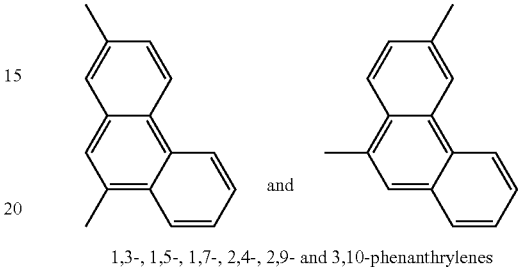

1,3- and 1,6-anthrylenes and any of these groups substituted by at least one monovalent substituting group, as above defined, in particular by a phenylketone group.

A third subset of kink-forming arylene units (Rb) is composed of optionally substituted arylene groups, the ends of which have the same direction and the same sense [kink-forming arylene units (Rb-3)]. Non limitative examples of optionally substituted arylene groups the ends of which the same direction and the same sense include:

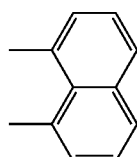

1,8-naphtylene

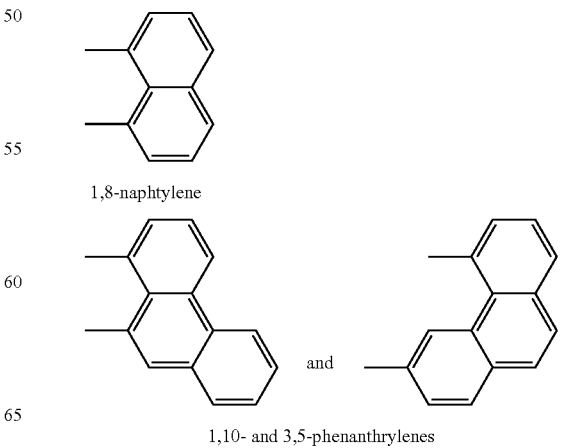

1,10- and 3,5-phenanthrylenes

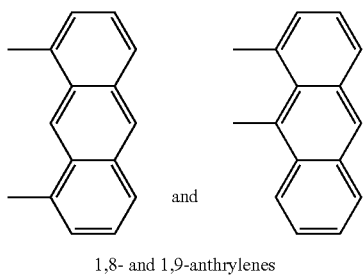

1,8- and 1,9-anthrylenes

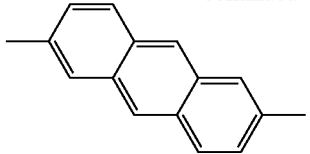

1,5-, 1,10- and 2,6-anthrylenes and any of these groups substituted by at least one monovalent substituting group, as above defined, in particular by a phenylketone group.

A fourth subset of kink-forming arylene units (Rb) is composed of optionally substituted arylene groups, the ends of which have the same direction, are of opposite sense and are disjoint [kink-forming arylene units (Rb-4)]. Non limitative examples of such optionally substituted arylene groups include:

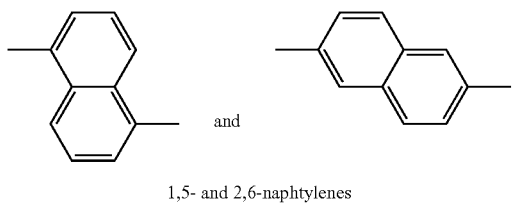

1,5- and 2,6-naphtylenes

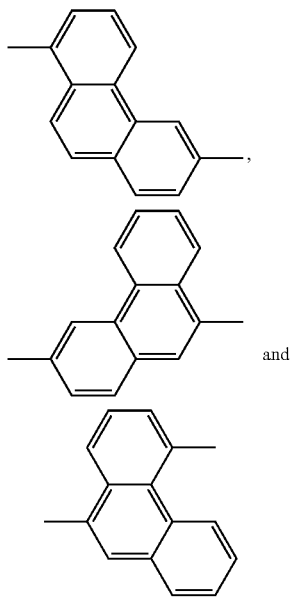

1,6-, 3,9- and 4,10-phenanthrylenes

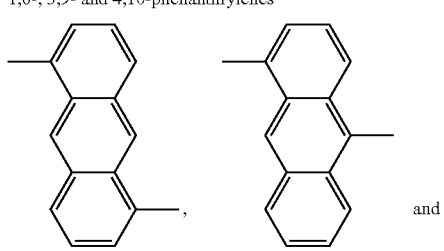

and any of these groups substituted by at least one monovalent substituting group, as above defined, in particular by a phenylketone group. Preferably, kink-forming arylene units (Rb) are chosen from kink-forming arylene units (Rb-1), kink-forming arylene units (Rb-2) and kink-forming arylene units (Rb-4). More preferably, kink-forming arylene units (Rb) are chosen from kink-forming arylene units (Rb-1) and kink-forming arylene units (Rb-2). Still more preferably, kink-forming arylene units (Rb) are chosen from kink-forming arylene units (Rb-1). Even still more preferably, kink-forming arylene units (Rb) are optionally substituted m-phenylenes.

Kink-forming arylene units (Rb), when contained in the polyarylene, result in more or less kinked polymer chains, exhibiting a higher solubility and fusibility than straight polymer chains. For this reason, such polyarylenes are commonly referred to as "kinked polymers".

The recurring units (R) of the kinked rigid-rod polyarylene suitable for the presently invented use and articles must be of a very specific type, namely they must be a mix (M) consisting of:
  between 0 and 75 mole %, based on the total number of moles of recurring units (R), of rigid rod-forming arylene units (Ra), said rigid rod-forming arylene units (Ra) being optionally substituted by at least one monovalent substituting group
with
  between 25 and 100 mole %, based on the total number of moles of recurring units (R), of kink-forming arylene units (Rb), said kink-forming arylene units being optionally substituted or not by at least one monovalent substituting group, The recurring units (R) are preferably a mix (M) consisting of:
  between 0 and 75 mole %, based on the total number of moles of recurring units (R), of rigid rod-forming arylene units (Ra) chosen from optionally substituted p-phenylenes,
with
  between 25 and 100 mole %, based on the total number of moles of recurring units (R), of kink-forming arylene units (Rb) chosen from (i) optionally substituted m-phenylenes and (ii) mixes of optionally substituted m-phenylenes with optionally substituted o-phenylenes.

Preferably, essentially all, if not all, the rigid rod-forming arylene units (Ra) of the mix (M) are p-phenylene units substituted by at least one substituting group. More preferably, essentially all, if not all, the rigid rod-forming arylene units (Ra) of the mix (M) are p-phenylenes substituted by at least one monovalent substituting group chosen from hydrocarbylketones [—C(=O)—R, where R is a hydrocarbyl group] and hydrocarbyloxyhydrocarbylketones [—C(=O)—R$^1$—O—R$^2$, where R$^1$ is a divalent hydrocarbon group and R$^2$ is a hydrocarbyl group], said hydrocarbylketones and hydrocarbyloxyhydrocarbylketones being themselves unsubstituted or substituted by at least one monovalent substituting group as those above listed. Still more preferably, essentially all, if not all, the rigid rod-forming arylene units (Ra) of the mix (M) are p-phenylenes substituted by at least one monovalent substituting group chosen from arylketones and aryloxyarylketones, said arylketones and aryloxyarylketones being unsubstituted or substituted by at least one monovalent substituting group as those above listed. Most preferably, essentially all, if not all, the rigid rod-forming arylene units (Ra) of the mix (M) are p-phenylenes substituted by an arylketone group, in particular by the phenylketone group.

Essentially all, if not all, the kink-forming arylene units (Rb) of the mix (M) are m-phenylene units optionally substituted by at least one substituting group. More preferably, essentially all, if not all, the kink-forming arylene units (Rb) of the mix (M) are m-phenylene units which are optionally substituted by at least one monovalent substituting group chosen from hydrocarbylketones [—C(=O)—R, where R is a hydrocarbyl group] and hydrocarbyloxyhydrocarbylketones [—C(=O)—$R^1$—O—$R^2$, where $R^1$ is a divalent hydrocarbon group and $R^2$ is a hydrocarbyl group], said hydrocarbylketones and hydrocarbyloxyhydrocarbylketones being themselves unsubstituted or substituted by at least one monovalent substituting group as those above listed. Still more preferably, essentially all, if not all, the kink-forming arylene units (Rb) of the mix (M) are unsubstituted m-phenylene units.

In the mix (M), the number of moles of the kink-forming arylene units (Rb), based on the total number of moles of the recurring units (R), is preferably of at least 30%, more preferably at least 35%, still more preferably at least 40% and most preferably at least 45%. On the other hand, in the mix (M), the number of moles of the kink-forming arylene units (Rb), based on the total number of moles of the recurring units (R), is preferably of at most 90%, more preferably at most 75%, still more preferably at most 65% and most preferably at most 55%.

Good results were obtained when the recurring units (R) were a mix consisting of p-phenylene units substituted by a phenylketone group with unsubstituted m-phenylene units, in a mole ratio of about 50:50.

The kinked rigid-rod polyarylene suitable for the presently invented use and articles may further comprise recurring units (R*), different from recurring units (R).

Recurring units (R*) may contain or not at least one strong divalent electron withdrawing group linked on each of its ends to an arylene group. Non limitative examples of recurring units (R*) free of such strong divalent electron withdrawing group are:

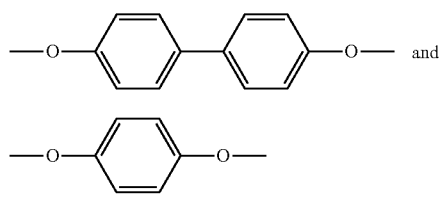
(1)
and
(2)

Recurring units (R*) contain preferably at least one strong divalent electron withdrawing group linked on each of its ends to an arylene group, in particular a p-phenylene group. The divalent electron withdrawing group is preferably chosen from the sulfone group [—S(=O)$_2$—], the carbonyl group [—C(=O)—], the vinylene group [—CH=CH—], the sulfoxide group [—S(=O)—], the azo group [—N=N—], saturated fluorocarbon groups like —C(CF$_3$)$_2$—, organic phosphine oxide groups [—P(=O)(=$R_h$)—, where $R_h$ is a hydrocarbyl group] and the ethylidene group [—C(=CA$_2$)-, where A can be hydrogen or halogen]. More preferably, the divalent electron withdrawing group is chosen from the sulfone group and the carbonyl group. Still more preferably, recurring units (R*) are chosen from:

(i) recurring units of formula

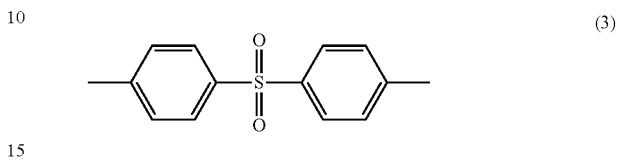
(3)

(ii) recurring units of formula

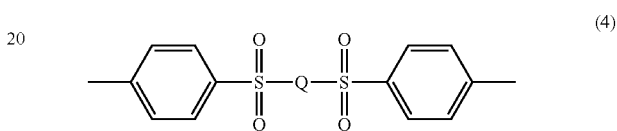
(4)

wherein Q is a group chosen from:

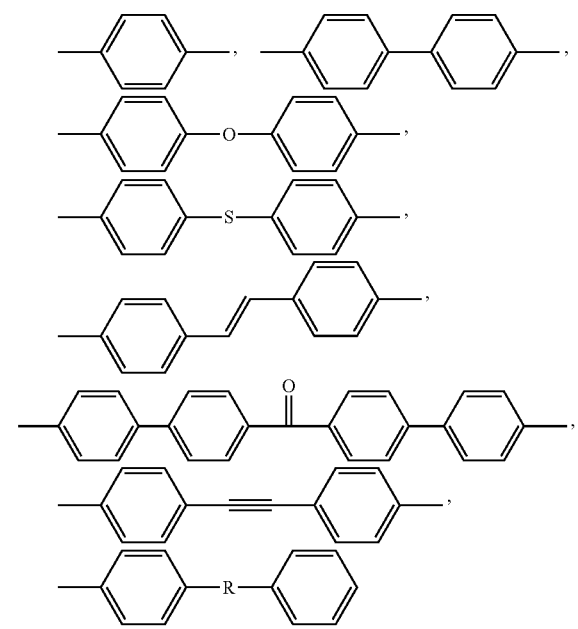

with R being:

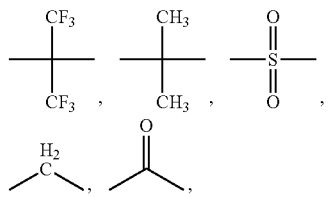

—[CF$_2$]$_n$—, —(CH$_2$)$_{n'}$—, with n being an integer from 1 to 6 and n' being an integer from 2 to 6, Q being preferably chosen from

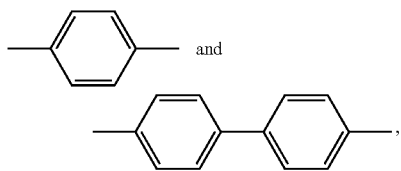

(iii) recurring units of formula

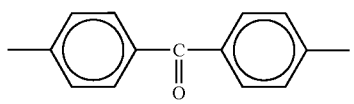

(5)

(iv) recurring units of formula

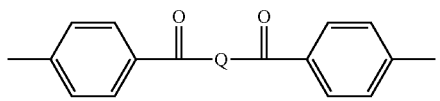

(6)

Preferably more than 75 wt. % and more preferably more than 90 wt. % of the recurring units of the polyarylene are recurring units (R). Still more preferably, essentially all, if not all, the recurring units of the polyarylene are recurring units (R).

Excellent results were obtained when the polyarylene was a kinked rigid-rod polyphenylene, essentially all, if not all, the recurring units of which consisted of a mix of p-phenylene substituted by a phenylketone group with unsubstituted m-phenylene in a mole ratio p-phenylene:m-phenylene of from 10:90 to 70:30, preferably of from 25:75 to 65:35, more preferably of from 35:65 to 60:40, still more preferably of from 45:55 to 55:45, and most preferably of about 50:50. Such a kinked rigid-rod polyphenylene is commercially available from Solvay Advanced Polymers, L.L.C. as PRIMOSPIRE™ PR-250 polyphenylene.

The kinked rigid-rod polyarylene suitable for the presently invented use and articles has usually a number average molecular weight greater than 1000, preferably greater than 5000, more preferably greater than about 10000 and still more preferably greater than 15000. On the other hand, the number average molecular weight of the kinked rigid-rod polyarylene is usually below 100000, and preferably below 70000. In a certain embodiment, the number average molecular weight of the kinked rigid-rod polyarylene is above 35000. In another embodiment, it is of at most 35000; in this embodiment, it is often of at most 25000 and sometimes of at most 20000. The number average molecular weight of a polyarylene in general, and in particular that of the kinked rigid-rod polyarylene suitable for the presently invented use and articles, is advantageously determined by: (1) measuring a "relative" number average molecular weight of the polyarylene by Gel Permeation Chromatography (GPC) using polystyrene calibration standards, then (2) dividing the so-measured "relative" number average molecular weight by a factor 2. It is proceeded accordingly because the skilled in the art who is a specialist of polyarylenes knows that their "relative" number average molecular weight, as measured by GPC, are generally off by a factor of about 2 times; it has already been accounted for this correction factor in all the above cited lower and upper limits of molecular weight.

It can be amorphous (i.e. it has no melting point) or semicrystalline (i.e. it has a melting point). It is preferably amorphous.

It has a glass transition temperature of advantageously above 50° C., preferably above 120° C. and more preferably above 150° C.

The kinked rigid-rod polyarylene suitable for the presently invented use can be prepared by any method. A method well known in the art to prepare such kinked rigid-rod polyarylene comprises polymerizing, preferably by reductive coupling, (i) at least one dihaloarylene molecular compound consisting of an optionally substituted rigid rod-forming arylene group, which is linked on each of its two ends to one halogen atom, such as chlorine, bromine and iodine, with (ii) at least one dihaloarylene molecular compounds consisting of an optionally substituted kink-forming arylene group, which is linked on each of its two ends to one halogen atom, such as chlorine, bromine, iodine, and fluorine. The elimination of the halogen atoms from the dihaloarylene molecular compounds results in the formation of respectively optionally substituted rigid rod-forming and optionally substituted kink-forming arylene groups.

Thus, for example:

the elimination of both chlorine atoms from a molecule of p-dichlorobenzene, p-dichlorobiphenyl or their homologous of general formula Cl-($\phi$)$_N$-Cl, N being an integer from 3 to 10, results in the formation of respectively 1, 2 or N adjacent p-phenylene units (rigid rod-forming arylene units); thus, p-dichlorobenzene, p-dichlorobiphenyl and their homologous of general formula Cl-($\phi$)$_N$-Cl, N as above defined, can be polymerized, so as to form p-phenylene units;

2,5-dichlorobenzophenone (p-dichlorobenzophenone) can be polymerized, so as to form 1,4-(benzoylphenylene) units (also rigid rod-forming arylene units);

m-dichlorobenzene can be polymerized, so as to form m-phenylene units (kink-forming arylene units).

In the present invention, one, two, three, or even more than three different polyarylenes can be used.

Embodiment (E*)

In a particular embodiment (E*), the kinked rigid-rod polyarylene (P) is used as fire-stabilizer additive of a thermoplastic polymer material (TM) comprising, as base polymer, a poly(aryl ether sulfone), namely a polymer of which at least 5 wt. % of the recurring units are recurring units of one ore more formulae comprising at least one arylene group, at least one ether group (—O—) and at least one sulfone group [—S(=O)$_2$—].

A film or a coating consisting of a material comprising the kinked rigid-rod polyarylene (P) and the poly(aryl ether sulfone) is also in accordance with this particular embodiment (E*).

The poly(aryl ether sulfone) may be a poly(biphenyl ether sulfone), in particular a polyphenylsulfone. To the purpose of the present invention, a poly(biphenyl ether sulfone) is intended to denote any polymer of which more than 50 wt. % of the recurring units are recurring units of one ore more formulae containing at least one p-biphenylene group:

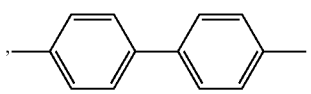

at least one ether group (—O—) and at least one sulfone group [—S(═O)₂—]. To the purpose of the present invention, a polyphenylsulfone denotes any polymer of which more than 50 wt. % of the recurring units are recurring units:

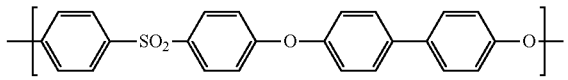

The kinked rigid-rod polyarylene (P) can be used as flame retardants, enhanced char-formation additive, and/or smoke retardant in a blend with a poly(aryl ether sulfone). The kinked rigid-rod polyarylene (P) can also be used as heat and smoke release stabilizers in a blend with a poly(aryl ether sulfone) used in aircraft interior applications; examples of specific applications include, but are not limited to, molded parts for aircraft window reveals, air ducts, seating and flight deck components, galleys, stow bins and sidewalls.

Blends comprising the kinked rigid-rod polyarylene (P) and a poly(aryl ether sulfone) may be fabricated into films. Many different methods may be used to form the films. Either continuous or batch processes may be used. Films may be prepared from the melt of from solution. Membranes useful for separations of mixed gases, liquids and solids, may also be fabricated from the films.

In embodiment (E*), the kinked rigid-rod polyarylene (P) may meet all the characteristics of the polyphenylenes described in PCT/EP2006/060535, as long as they are compatible with those of the kinked rigid-rod polyarylene (P) described in the present document.

The person skilled in the art will understand that the invention is not intended to be limited to this particular embodiment (E*), but encompasses also any embodiment other than (E*) which is described in the present document. Besides, various modifications to the embodiments described in the present document will be readily apparent to those skilled in the art, and the generic principles defined herein may be applied to other embodiments without departing from the spirit and scope of the invention; thus, this invention is also not intended to be limited to all the embodiments shown, but is to be accorded the widest scope consistent with the principles and features disclosed herein.

EXAMPLES

The polymers that were used are:
- a polyphenylene copolymer essentially all, if not all, the recurring units of which consisted of a mix of p-phenylene substituted by a phenylketone group with unsubstituted m-phenylene in a mole ratio p-phenylene:m-phenylene of about 50:50, commercially available from Solvay Advanced Polymers, L.L.C. as PRIMOSPIRE™ PR-250 polyphenylene;
- a polyphenylene copolymer essentially all, if not all, the recurring units of which consisted of a mix of p-phenylene substituted by a phenylketone group with unsubstituted m-phenylene in a mole ratio p-phenylene:m-phenylene of about 85:15, commercially available from Solvay Advanced Polymers, L.L.C. as PRIMOSPIRE™ PR-120 polyphenylene;
- a bisphenol A polycarbonate homopolymer, commercially available from General Electric as LEXAN®104 polycarbonate;
- a polyetherimide homopolymer ULTEM® 1000, commercially available from General Electric.

First Experimental Set

TABLE 1

Flammability Data on Lexan ® 104 polycarbonate and its blends with Primospire ™ PR-120 and Primospire ™ PR-250 polyphenylenes using the UL 94 Vertical Burn Method.

|  | CE1 (comparative) | CE2 (comparative) | CE3 (comparative) | E1 (according to the invention) | E2 (according to the invention) |
|---|---|---|---|---|---|
| Lexan ® 104 polycarbonate (wt. %) | 100 | 90 | 80 | 90 | 80 |
| Primospire ™ PR-120 polyphenylene (wt. %) | 0 | 10 | 20 | 0 | 0 |
| Primospire ™ PR-250 polyphenylene (wt. %) | 0 | 0 | 0 | 10 | 20 |
| Total Burn Time (sec) (10 specimens) | 145 | 208 | 174 | 156 | 92 |
| Longest burn time $T_1$ (sec) (10 specimens) | 28 | 52 | 64 | 35 | 16 |
| Longest burn time $T_2$ (sec) (10 specimens) | 9 | 12 | 19 | 18 | 13 |

(10 specimens - all the specimens were 3.2 mm in thickness)

The shorter the total burn time and the longest burn times $T_1$ (time after $1^{st}$ 10 second exposure to the flame) and $T_2$ (time after $2^{nd}$ 10 second exposure to the flame) are, the better.

Second Experimental Test

TABLE 2

Cone Calorimetry (ASTM E-1354) Results for Ultem ® 1000 polyetherimide and its blends with Primospire ™ PR-120 and Primospire ™ PR-250 polyphenylenes

|  | Peak HRR (kW/m²) | $S_A$ (m²/m²) | HRR Average [300 s] (kW/m²) |
|---|---|---|---|
| CE4 (comparative example) Ultem ® 1000 - 100 wt. % | 255 | 956 | 161 |
| CE5 (comparative example) Ultem ® 1000 - 90 wt. % Primospire ™ PR-120 - 10 wt. % | 205 | 751 | 151 |
| E3 (according to the invention) Ultem ® 1000 - 90 wt. % Primospire ™ PR-250 - 10 wt. % | 188 | 711 | 138 |

Key

Peak HRR=Peak heat release rate.

$S_A$=total smoke generated from sample prior to and during flaming combustion.

HRR Average [300 s]=average heat release rate during first 5 minutes (300 seconds) of sample combustion.

The lower Peak HRR, $S_A$ and HRR Average [300s], the better.

Third Experimental Set

A Lindy-type fire test was used, with an oxyacetylene torch at 4000° F., held 4 inches from a ¼ inch thick polymer plaque.

In a first variation (V1) of the Lindy-type test, no sandblasting was used.

In another variation (V2) of the Lindy-type test, sandblasting was used, using a commercial cleaning sandblaster. Variation (V2) is much more severe than (V1).

TABLE 3

Lindy-type fire test results.

| | CE6 (comparative) | E4 (according to the invention) |
|---|---|---|
| Primospire ™ PR-120 polyphenylene (wt. %) | 100 | 0 |
| Primospire ™ PR-250 polyphenylene (wt. %) | 0 | 100 |
| V1 lasting time (sec) | 97 | Test passed (>125) |
| V2 lasting time | <<97 | Test passed (>125) |

Fourth Experimental Set

Films consisting of either Primospire™ PR-250 polyphenylene (according to the invention) or Primospire™ PR-120 polyphenylene (comparative) were prepared.

Both experiments were performed on a Killion 1 inch single screw extruder with a length to diameter ratio of 30 and a compression ratio of 2:1.

The extruder was equipped with 5 temperature zones that were set at the following temperatures in order from the feed zone to the die:
130° C. (feed zone)
280° C. (Z1)
290° C. (Z2)
300° C. (Z3)
310° C. (Z4)
320° C. (die temp).

The die used was a tapered film die with an opening 4 inches wide and ⅛ inch high.

The rate of extrusion was adjusted to so that the pressure was between 4000 and 5000 psi.

Extrusion of Primospire™ PR-120 polyphenylene resulted in a film (CE7) with rippled edges extending 1 inch from each side into the middle of the film.

Also the film (CE7) could not be drawn.

To the contrary, extrusion of Primospire™ PR-250 polyphenylene resulted surprisingly in a smooth, unrippled film (E5). Additionally the film (E5) could be drawn.

The invention claimed is:

1. A method for increasing the fire resistance of a thermoplastic polymer material (TM) in need thereof,
    said thermoplastic polymer material (TM) comprising more than 50 wt. % based on the total weight of the thermoplastic polymer material (TM), of at least one thermoplastic polymer (T) as base polymer,
    said method comprising blending the thermoplastic polymer (T) with less than 50%, based on the total weight of the thermoplastic polymer material (TM), of at least one fire-stabilizer additive which is a kinked rigid-rod polyarylene (P),
    wherein the kinked rigid-rod polyarylene (P) is a kinked rigid-rod polyphenylene, essentially all the recurring units of which consist of a mix of p-phenylene substituted by a phenylketone group with unsubstituted m-phenylene in a mole ratio p-phenylene:m-phenylene of from 45:55 to 55:45.

2. The method according to claim 1, wherein the polymer material (TM) is in the need of exhibiting reduced burn time and/or peak heat release rate characteristics when it is exposed to flames.

3. The method according to claim 1, wherein the polymer material (TM) is in the need of generating less smoke when it is exposed to flames.

4. A method for increasing the fire resistance of a self fire-resistant material (SM) in the need thereof,
    said self fire-resistant material (SM) comprising more than 50 wt. % and less than 100 wt. %, based on the total weight of the self-fire resistant material (SM), of a base polymer, and at least one other ingredient,
    said method comprising using as the base polymer at least one kinked rigid-rod polyarylene (P),
    wherein the kinked rigid-rod polyarylene (P) is a kinked rigid-rod polyphenylene, essentially all the recurring units of which consist of a mix of p-phenylene substituted by a phenylketone group with unsubstituted m-phenylene in a mole ratio p-phenylene:m-phenylene of from 45:55 to 55:45.

5. A method for increasing the fire resistance properties of a material comprised in a fire-retarded application in the need thereof,
    said method comprising using as the material at least one kinked rigid-rod polyarylene (P) wherein the kinked rigid-rod polyarylene (P) is a kinked rigid-rod polyphenylene, essentially all the recurring units of which consist of a mix of p-phenylene substituted by a phenylketone group with unsubstituted m-phenylene in a mole ratio p-phenylene:m-phenylene of from 45:55 to 55:45.

6. The method according to claim 5, wherein the fire-retarded application is an aircraft application.

7. The method according to claim 6, wherein the aircraft application is selected from the group consisting of molded parts for aircraft window reveals, air ducts, seating and flight deck components, galleys, stow bins and sidewalls.

8. The method according to claim 5, wherein the fire-retarded application is selected from the group consisting of films and coatings.

9. The method according to claim 5, wherein the kinked rigid-rod polyarylene (P) is used as self-fire resistant material in the absence of any other ingredient.

* * * * *